US012602343B2

(12) United States Patent
Ryan

(10) Patent No.: US 12,602,343 B2
(45) Date of Patent: Apr. 14, 2026

(54) MATERIAL DISPLAY SYSTEM AND METHOD

(71) Applicant: Michael O. Ryan, Lenox, MA (US)

(72) Inventor: Michael Ryan, Pittsfield, MA (US)

(73) Assignee: Michael O. Ryan, Lenox, MA (US)

( * ) Notice: Subject to any disclaimer, the term of this patent is extended or adjusted under 35 U.S.C. 154(b) by 0 days.

(21) Appl. No.: 18/853,911

(22) PCT Filed: Mar. 21, 2024

(86) PCT No.: PCT/US2024/020920

§ 371 (c)(1),
(2) Date: Oct. 3, 2024

(87) PCT Pub. No.: WO2025/170601

PCT Pub. Date: Aug. 14, 2025

(65) Prior Publication Data

US 2025/0258791 A1     Aug. 14, 2025

Related U.S. Application Data

(60) Provisional application No. 63/550,297, filed on Feb. 6, 2024.

(51) Int. Cl.
G06F 13/40          (2006.01)
G06F 1/16          (2006.01)

(52) U.S. Cl.
CPC .......... G06F 13/409 (2013.01); G06F 1/1601 (2013.01)

(58) Field of Classification Search
CPC ......... A47G 1/1606; A47G 1/162; A47F 7/16; G09F 2007/186; G09F 7/18

USPC .... 248/581, 589, 610, 342, 690, 489, 475.1, 248/215, 304; 211/44
See application file for complete search history.

(56) References Cited

U.S. PATENT DOCUMENTS

| | | | | |
|---|---|---|---|---|
| 2,812,067 A | * | 11/1957 | Gussack | ................. A47F 7/163 |
| | | | | 211/94.01 |
| 2,851,167 A | * | 9/1958 | Rosenberg | ............. B42F 15/06 |
| | | | | 211/162 |
| 2,857,696 A | * | 10/1958 | Barrow, I | ............. A47F 5/0006 |
| | | | | 40/658 |
| 3,530,593 A | | 9/1970 | Howard | |
| 3,530,984 A | | 9/1970 | Howard | |
| 3,900,108 A | * | 8/1975 | Rottermann | ............. A47F 7/16 |
| | | | | 211/94.01 |
| 3,924,507 A | * | 12/1975 | Faroni | ..................... B41J 29/04 |
| | | | | 411/548 |

(Continued)

FOREIGN PATENT DOCUMENTS

| | | |
|---|---|---|
| GB | 2262765 | 8/1994 |
| WO | 2004073463 | 9/2004 |

OTHER PUBLICATIONS

H&H, "Miscellaneous Track Hardware" (2011).
Mussion Musical, "Right Angle Suspension Clamp," https://www.musson.com/435r-right-angle-batten-suspension-clamp.html.

*Primary Examiner* — Cassandra Davis
(74) *Attorney, Agent, or Firm* — 24IP Law Group USA, PLLC; Timothy R DeWitt

(57) ABSTRACT

A display system having a monolithic building material having a hole therein, a structural support and a male/female connector connecting the structural support to the monolithic building material through the hole in the monolithic building material.

4 Claims, 12 Drawing Sheets

(56)             References Cited

U.S. PATENT DOCUMENTS

| | | | | |
|---|---|---|---|---|
| 4,181,381 | A * | 1/1980 | St. Amand | B42F 17/00 |
| | | | | 281/43 |
| 6,446,932 | B1 | 9/2002 | Fairfield | |
| 6,526,626 | B1 | 3/2003 | Lotufo | |
| 8,573,411 | B2 | 11/2013 | Folz et al. | |
| 11,844,448 | B2 * | 12/2023 | Spiro | A47G 1/0638 |
| 2005/0076553 | A1 * | 4/2005 | Kim | G09F 7/22 |
| | | | | 40/607.09 |
| 2007/0110543 | A1 * | 5/2007 | Fitch | F16B 33/006 |
| | | | | 411/386 |
| 2009/0081621 | A1 | 3/2009 | Harrison | |
| 2009/0107934 | A1 | 4/2009 | Cooper | |
| 2015/0079547 | A1 | 3/2015 | Moss | |
| 2016/0148545 | A1 * | 5/2016 | Donadee | A47F 5/0006 |
| | | | | 248/344 |
| 2018/0125264 | A1 | 5/2018 | Patrick et al. | |
| 2023/0401982 | A1 | 12/2023 | Lee | |

* cited by examiner

500

12 cm STEEL

210

200

300

520          510

510

520

510

100

800

800

1010

1020

MATERIAL DISPLAY SYSTEM AND METHOD

CROSS-REFERENCE TO RELATED APPLICATIONS

The present application claims the benefit of the filing date of U.S. Provisional Patent Application Ser. No. 63/550,297 filed by the present inventor on Feb. 6, 2024.

The aforementioned provisional patent application is hereby incorporated by reference in its entirety.

BACKGROUND OF THE INVENTION

Field of the Invention

The present invention relates to a system that combines the use of a male, female support or handle and a water jet or laser hole for monolithic building materials such as tile, marble, counter tops or pavers, and more particularly, to a system for allowing heavy materials to be handled and displayed safely and conveniently via a hole in the material.

Brief Description of the Related Art

As used herein "monolithic building material" means a construction item that commonly is displayed for a point of purchase selection by a customer and is dense (i.e., density greater than 1300 kg/m³), heavy, rigid, breakable, and resistant to conventional drilling, including but not limited to ceramic tile, porcelain tile, glass tile, granite tile, travertine, quartzite, sandstone, stone, concrete, Cementous siding, slate, pavers, and synthetic materials with similar densities. These materials can be for outdoor or indoor use and may be used, for example, on a floor, wall, roof, countertop or landscape. These dense, heavy, rigid and breakable building materials are more difficult to display safely and effectively than less dense materials such as rubber (density approximately 1100 kg/m³), polyethylene (density approximately 1100 kg/m³), wood (density approximately 500-1800 kg/m³), or carpet (carpet underlay density approximately 110 kg/m³). Monolithic building materials have been and are handled and displayed in a variety of ways at the point of purchase, ranging from loose materials to display boards having materials mounted to them. In recent years material sizes have been increasing, making displaying monolithic building materials at points of purchase more difficult, and in some instances for very large materials dangerous to handle and display. Current trends include monolithic building materials that are 12"×18", 12"×24", 24"×24", 24"×48" and even 48"×60. Even larger monolithic materials are possible. These large items can be very heavy and difficult to handle safely. Moreover, mounting such materials securely to displays can be difficult and exceed OSHA safety handling requirements.

SUMMARY OF THE INVENTION

In a preferred embodiment, the present invention is a point of purchase handling and display system comprising a monolithic building material having a hole therein and a male/female support and/or handle connected to the monolithic building material through the hole in the material. The male/female support has a structural member, for example, with an I-shaped cross-section, a front support member extending from a front side of a bottom of the structural member onto a front face of the monolithic building material, a back support member extending from a rear side of a bottom of the structural member onto a back face of the monolithic building material, the back support having the female side of the connector for receiving a male side of a connector, e.g., a hole for receiving a pin, the hole in the back support being aligned with the hole in the monolithic building material. A handle may extend from a top side of the structural support, and a male connector part having a head on a front side of the monolithic building material and a pin extending from the head on the front face of the monolithic building material, through the hole in the monolithic building material, and secured in the female connector part, e.g., hole, in the back support member. The structural member, the front support member, and the back support member may be formed of injection-molded plastic, aluminium, or other material sufficiently strong to support the monolithic building material from the support. The system may include printed matter on the head of the male connector and/or on a backside of the back support. The printed matter may be on a label and may be, for example, a QR code or logo. The system may further have a metal sheath on the pin to provide additional strength for supporting the monolithic building material. The handle may have an opening ergonomically shaped, for example, to receive three or four fingers. The handle further may have a hole allowing for the system to be hung from a pin or hook of a display, or the opening in the handle may be shaped to allow the system to be hung from a pin or hook in a display. The head of the connector may be round, square, triangular, or any other shape.

In another preferred embodiment, the present invention is a point of purchase handling and display system comprising a rigid building material having a density greater than 1300 kg/m³ and having a hole therein and a male/female support and/or handle connected to the building material through the hole in the material. The male/female support has a structural member, for example, with an I-shaped cross-section, a front support member extending from a front side of a bottom of the structural member onto a front face of the building material, a back support member extending from a rear side of a bottom of the structural member onto a back face of the building material, the back support having the female side of the connector for receiving a male side of a connector, e.g., a hole for receiving a pin, the hole in the back support being aligned with the hole in the building material. A handle may extend from a top side of the structural support, and a male connector part having a head on a front side of the building material and a pin extending from the head on the front face of the building material, through the hole in the building material, and secured in the female connector part, e.g., hole, in the back support member. The structural member, the front support member, and the back support member may be formed of injection-molded plastic, aluminium, or other material sufficiently strong to support the monolithic building material from the support. The system may include printed matter on the head of the male connector and/or on a backside of the back support. The printed matter may be on a label and may be, for example, a QR code or logo. The system may further have a metal sheath on the pin to provide additional strength for supporting the building material. The handle may have an opening ergonomically shaped, for example, to receive three or four fingers. The handle further may have a hole allowing for the system to be hung from a pin or hook of a display, or the opening in the handle may be shaped to allow the system to be hung from a pin or hook in a display. The head of the connector may be round, square, triangular, or any other shape.

Other arrangements of the invention are possible. For example, in an alternate embodiment the system for displaying a monolithic building material has a monolithic building material having a hole therein and a monolithic building material support connected to the monolithic building material. The monolithic building material support has a structural member with an I-shaped cross-section; a front support member extending from a front side of a bottom of the structural member onto a front face of the monolithic building material and over the hole in the monolithic building material; a back support member extending from a rear side of a bottom of the structural member onto a back face of the monolithic building material, the back support having a hole for receiving a pin, the hole in the back support being aligned with the hole in the monolithic building material; and a handle extending from a top side of the structural support. The front support member has a pin extending from the from the front support member, through the hole in the monolithic building material and secured in the hole in the back support member.

In yet another embodiment, the present invention is a point of purchase display system having a monolithic building material having a hole therein, a structural support and a male-female connector connecting the structural support to the monolithic building material through the hole in the monolithic building material.

In still another embodiment, the present invention is a method for displaying monolithic building materials. The method comprises the steps of making a hole in a monolithic building material with a water jet or laser, connecting an I-beam support member to the monolithic building material with a male/female connector through the hole in the monolithic building material; and sliding the I-beam support connected to the building material into a slot in a display stand. The method may further include repeating these steps for second and subsequent monolithic building materials to create a single display of a plurality of monolithic building materials. The display stand may be a vertical display, a horizontal display, or a display integral with a workstation.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1A:
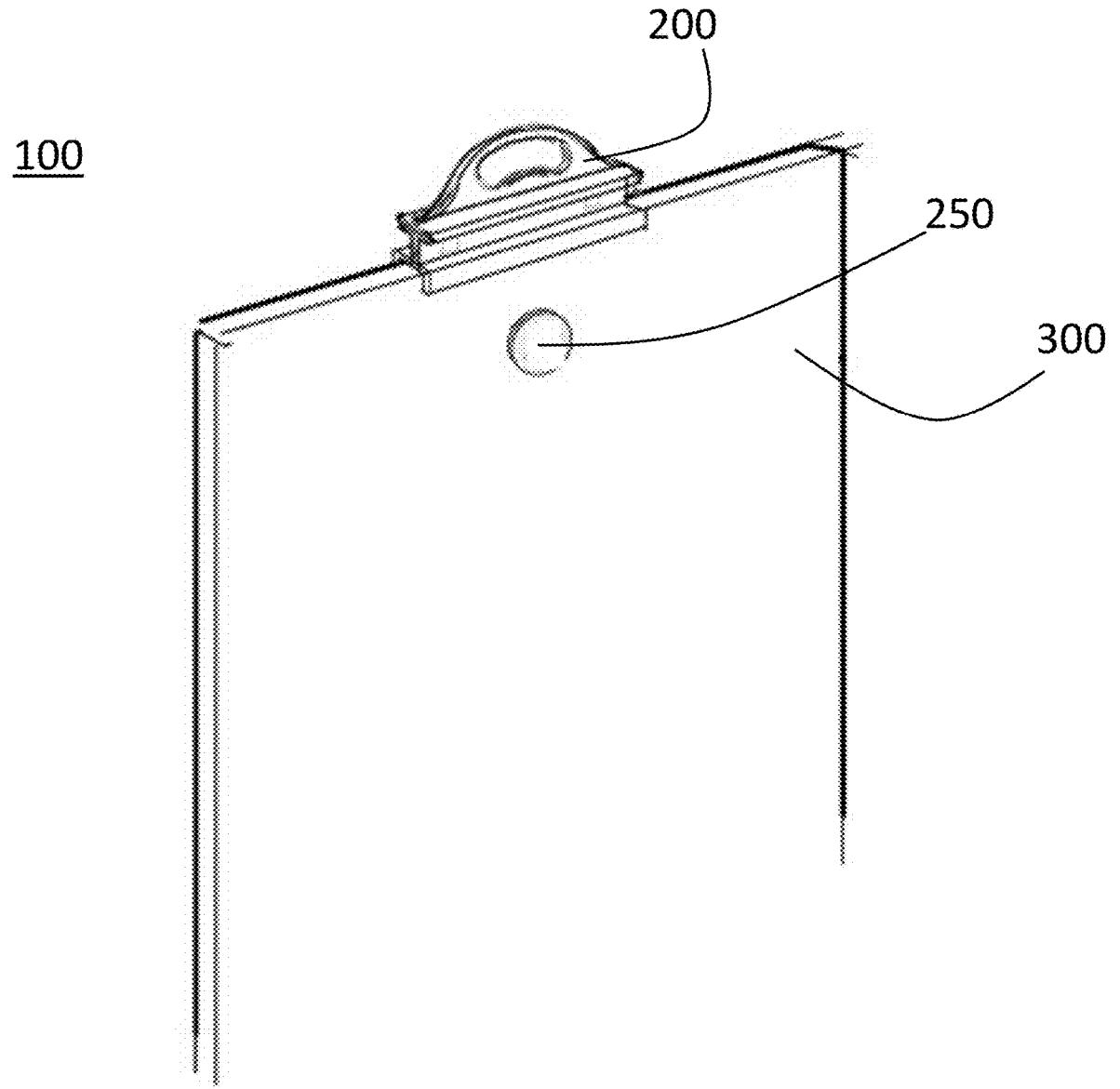
FIG. 1A is a front perspective view of a system for handling and/or displaying a monolithic building material at a point of purchase in accordance with a preferred embodiment of the present invention.
Figure 1B:
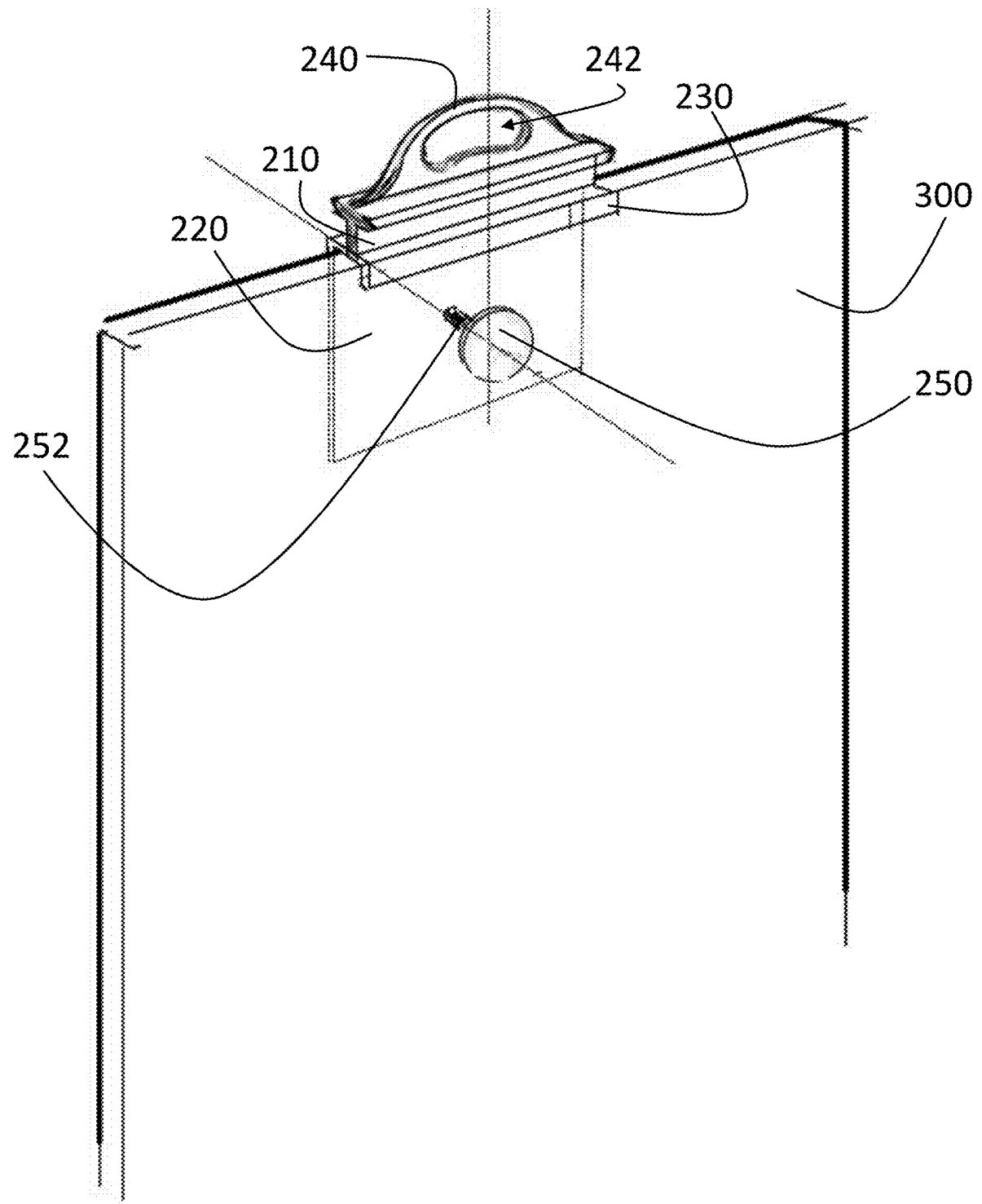
FIG. 1B is a see-through front perspective view a system for handling and/or displaying a monolithic building material at a point of purchase in accordance with a preferred embodiment of the present invention.
Figure 2:
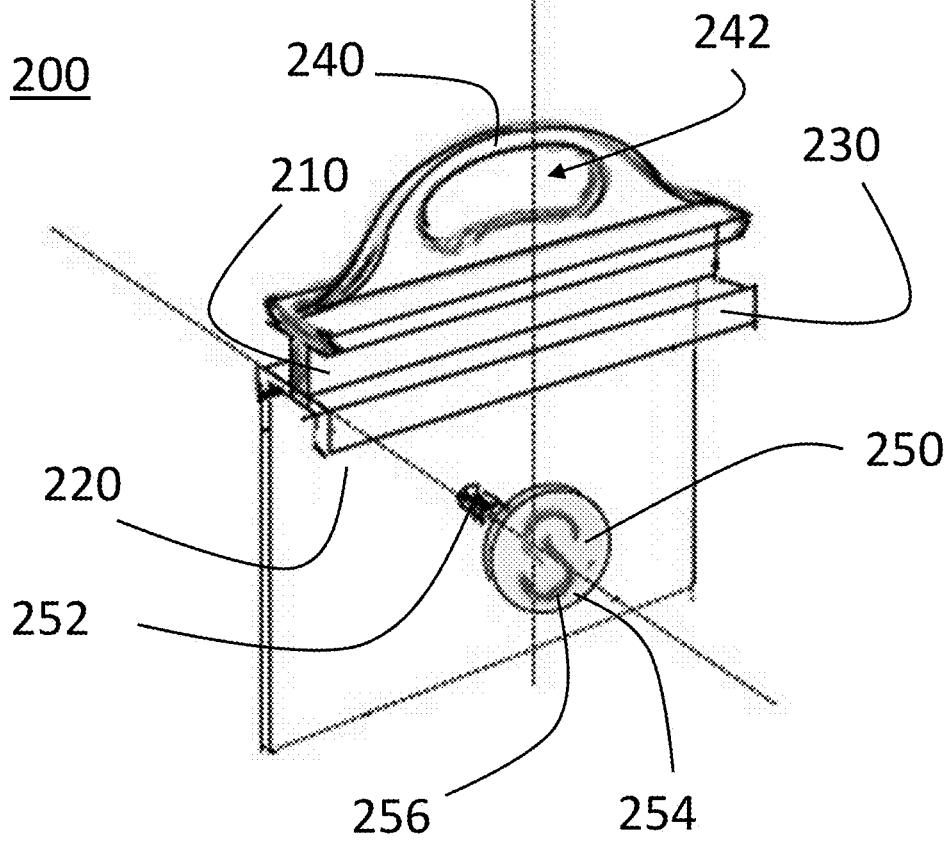
FIG. 2 is a front perspective view a monolithic building material support in a system for handling and/or displaying a monolithic building material at a point of purchase in accordance with a preferred embodiment of the present invention.
Figure 3:
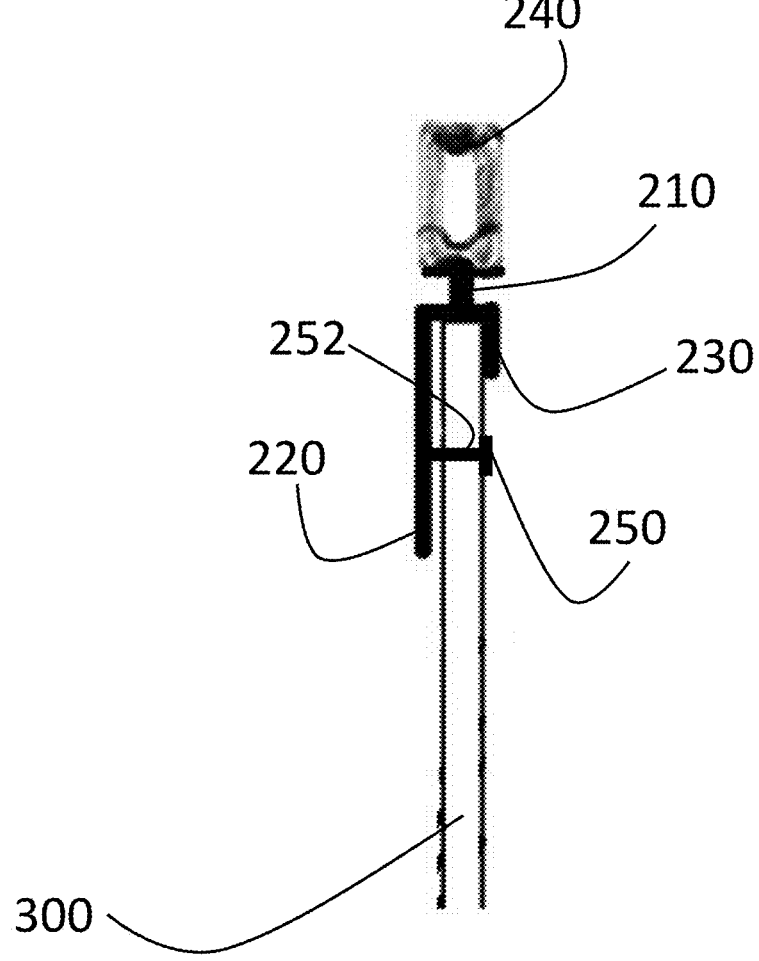
FIG. 3 is a side cross-sectional view of a system for handling and/or displaying a monolithic building material at a point of purchase in accordance with a preferred embodiment of the present invention.
Figure 4:
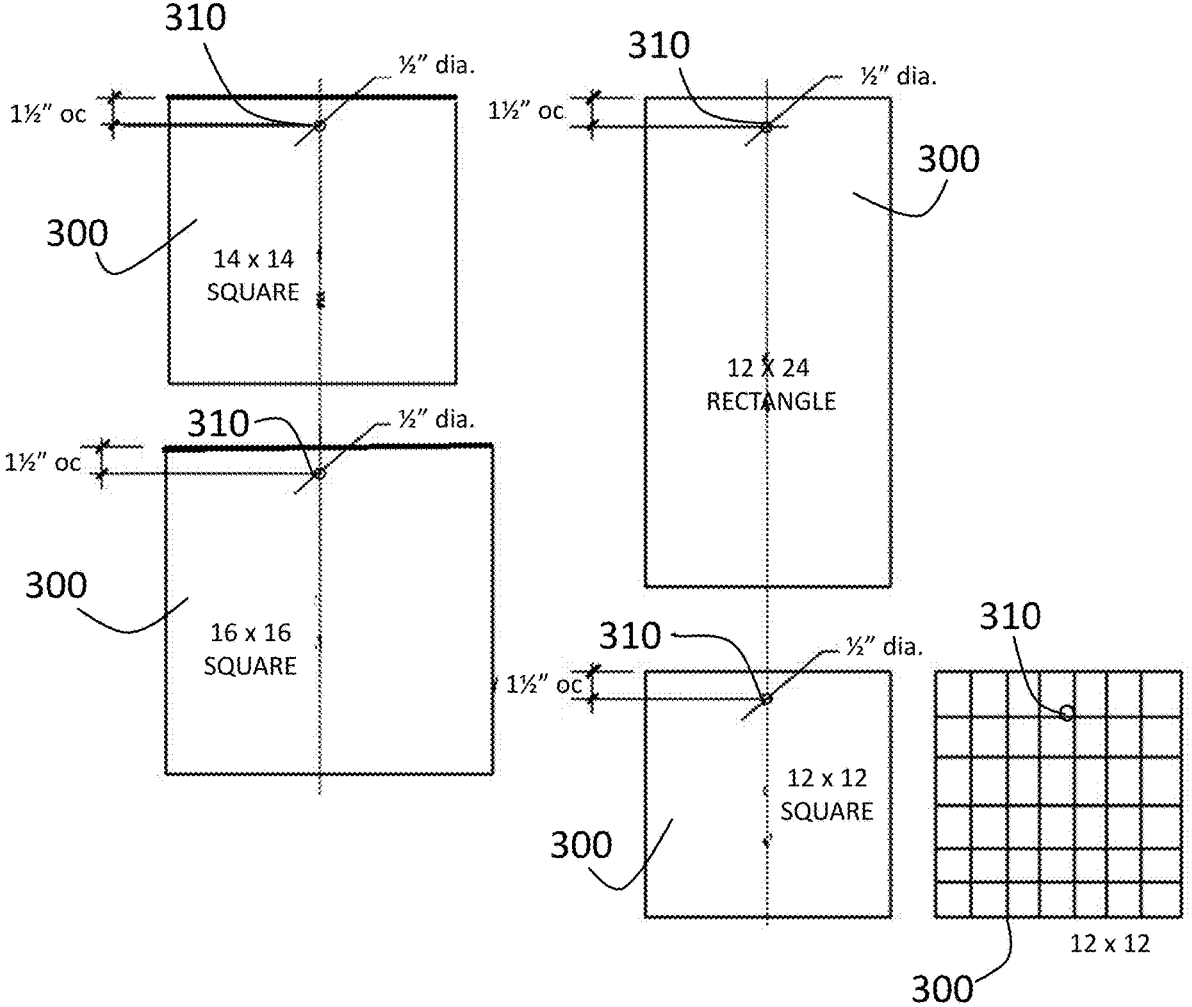
FIG. 4 is a diagram of various arrangements of a monolithic building material with a hole for a system for handling and/or displaying a monolithic building material at a point of purchase in accordance with a preferred embodiment of the present invention.

Preferred embodiments of the present invention will be described with reference to the drawings. A system (100) for handling and/or displaying a monolithic building material at a point of purchase comprises a monolithic building material (300) having a hole (310) therein and a sleeve or monolithic building material support (200) connected to the monolithic building material (300). As shown in FIG. 4, the monolithic building material (300) may be of many different types, shapes and sizes or may be a sheet of smaller monolithic building materials, and the hole (310) preferably is positioned near one side of the monolithic building material. The monolithic building material has a density greater than 1300 kg/m³. The monolithic building material may be, for example, ceramic tile (density approximately 1400 kg/m³), porcelain tile (density approximately 2400 kg/m³), glass tile (density approximately 2500 kg/m³), marble tile (density approximately 2711 kg/m³), granite tile (density approximately 1400 kg/m³), natural stone tile, travertine (density approximately 2700 kg/m³), quartzite (density approximately 2710 kg/m³), sandstone (density approximately 2323 kg/m³), Corian (density approximately 1700 kg/m³), limestone (density approximately 2750 kg/m³), concrete (density approximately 2700 kg/m³), Cementous siding (nominal density approximately 1332 kg/m³) porcelain tile (density approximately 2400 kg/m³), pavers, or a similar synthetic material having density greater than 1300 kg/m³.

The hole (310) in the monolithic building material (300) may be created, for example, with a waterjet. Further, the water-jetting of holes in the monolithic building material (300) may be performed on more than one monolithic building material at a time, for example, by stacking two or more monolithic building materials to create a hole in each monolithic building material with a single water-jet procedure.

The sleeve or monolithic building material support (200) has a structural member (210) preferably with an I-shaped cross-section. A front support member (230) such as a flange extends from a front side of a bottom of the structural member (210) onto a front face of the monolithic building material (300). In a preferred embodiment the front support member (230) extends enough to secure the monolithic building material support (200) to the monolithic building material (300) but covers as little of the front face of the monolithic building material (300) as possible to allow a clear view of as much of the front face of the monolithic building material (300) as possible. The front support member in the figures is shown as a continuous flange along the full length of the structure support member (210) but one of skill in the art will understand that other arrangements, such as a flange that extends along only a portion of the structural support member or a plurality of tabs, may be used with the present invention as long as the front support member has sufficient strength to support the front face of the monolithic building material (300). A back support member (220) extends from a rear side of a bottom of the structural member (210) onto a back face of the monolithic building material (300). In a preferred embodiment the back support member (220) is larger than the front support member (230) and is rectangular in shape. Again, one of skill in the art will understand that other arrangements of the back support member may be used with the present invention. The back support member (220) has a hole (not shown) for receiving a pin (252). The hole in the back support (220) being aligned with the hole (310) in the monolithic building material (300). The pin (252) and back support member have means for locking the pin (22) into the hold in the back support member (220). The locking means may be, for example, a snap-in structure or the pin (252) and hole in the back support member may be threaded. A variety of snap-in structures, such as a pin having tabs biased away from the pin that are depressed as the pin is inserted into the hole. Still another possibility is that a bolt and nut structure may be used such that the pin (252) extends through the hole (310) in the monolithic building material and the hole in the back support member and a nut is tightened from the back side of the back support member. Further, an opposite arrangement may be possible in which the connector having a pin is interested from the back of the back support member and extends through the hole (310) in the monolithic building material and is secured with a nut having a head.

A handle (240) extends from a top side of the structural support (210), and a connector (250) having a head (254) on a front side of the monolithic building material (300) and a pin (252) extends from the head (254) on the front face of the monolithic building material (300), through the hole (310) in the monolithic building material (300) and secured in the hole in the back support member (220).

The structural member (210), the front support member (230), and the back support member (220) may be formed of injection-molded plastic, aluminium, or other material sufficiently strong to support the monolithic building material from the monolithic building material support (200). The system may include printed matter on the head (254) of the connector (250) and/or on a backside of the back support member (220). As shown in FIGS. 9A, 9B, 10A, and 10B, printed matter may be on a label (1010, 1020) and may be, for example, a QR code or logo. The system may further have a metal sheath (not shown) on the pin (252) to provide additional strength for supporting the monolithic building material (300). The handle (240) may have an opening ergonomically shaped, for example, to receive three fingers. Further, the handle (240) may be over molded, for example, with a rubber material to provide a better grip. The handle (240) further may have a hole allowing for the system to be hung from a pin or hook, or the opening (242) in the handle (240) may be shaped to allow the system to be hung from a pin or hook by the handle. The head (254) of the connector (250) may be round, square, triangular, or any other shape.

In a second preferred embodiment of the invention, shown in FIGS. 8A-10B, the monolithic building material support (800) has a structural member (810) with an I-shaped cross-section; a front support member (830) extending from a front side of a bottom of the structural member (810) onto a front face of the monolithic building material (300) and over the hole (310) in the monolithic building material (300); a back support member (820) extending from a rear side of a bottom of the structural member (810) onto a back face of the monolithic building material (300), the back support (820) having a post (822) for receiving a pin (852), the post (822) on the back support (820) being aligned with the hole (310) in the monolithic building material (300); and a handle (840) extending from a top side of the structural support (810).

Other arrangements of the invention are possible. For example, in an alternate embodiment the system for displaying a monolithic building material (100) has a monolithic building material (300) having a hole (310) therein and a monolithic building material support (200) connected to the monolithic building material (300). The monolithic building material support (200) has a structural member (210) with an I-shaped cross-section; a front support member (230) extending from a front side of a bottom of the structural member (210) onto a front face of the monolithic building material (300) and over the hole (310) in the monolithic building material (300); a back support member (220 extending from a rear side of a bottom of the structural member (210) onto a back face of the monolithic building material (300), the back support (220) having a hole for receiving a pin (252), the hole in the back support (220) being aligned with the hole (310) in the monolithic building material (300); and a handle (240) extending from a top side of the structural support (210). The front support member (230) has a pin extending from the from the front support member (230), through the hole (310) in the monolithic building material (300) and secured in the hole in the back support member (220). In this arrangement the pin is integral with the front support rather than being a separate connector. Still further, the arrangement may be the opposite such that the pin is integral with the back support member.

Other embodiments also are possible. For example, for a very large monolithic building material the system may include the monolithic building material and two or more monolithic building material supports (200), for example, on adjacent sides or on the same side. In addition to providing assistance in lifting or suspending a monolithic building material (300), the present invention may serve other purposes such as serving as bumpers between monolithic building materials during shipping.

Figure 5:
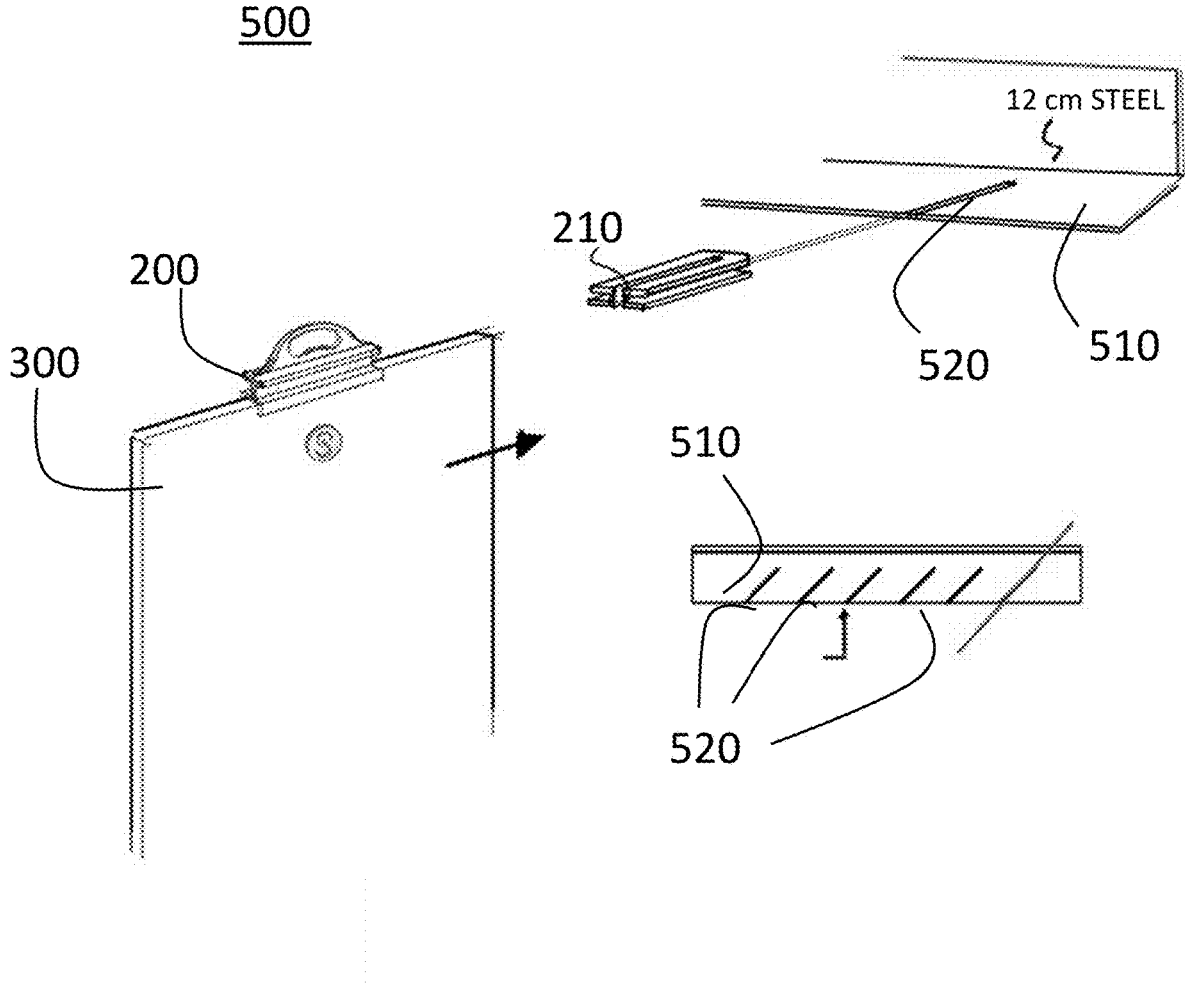
FIG. 5 is a diagram illustrating placement of a monolithic building material and support into a hanging display arrangement of a system for displaying a monolithic building material at a point of purchase in accordance with a preferred embodiment of the present invention.
Figure 6:
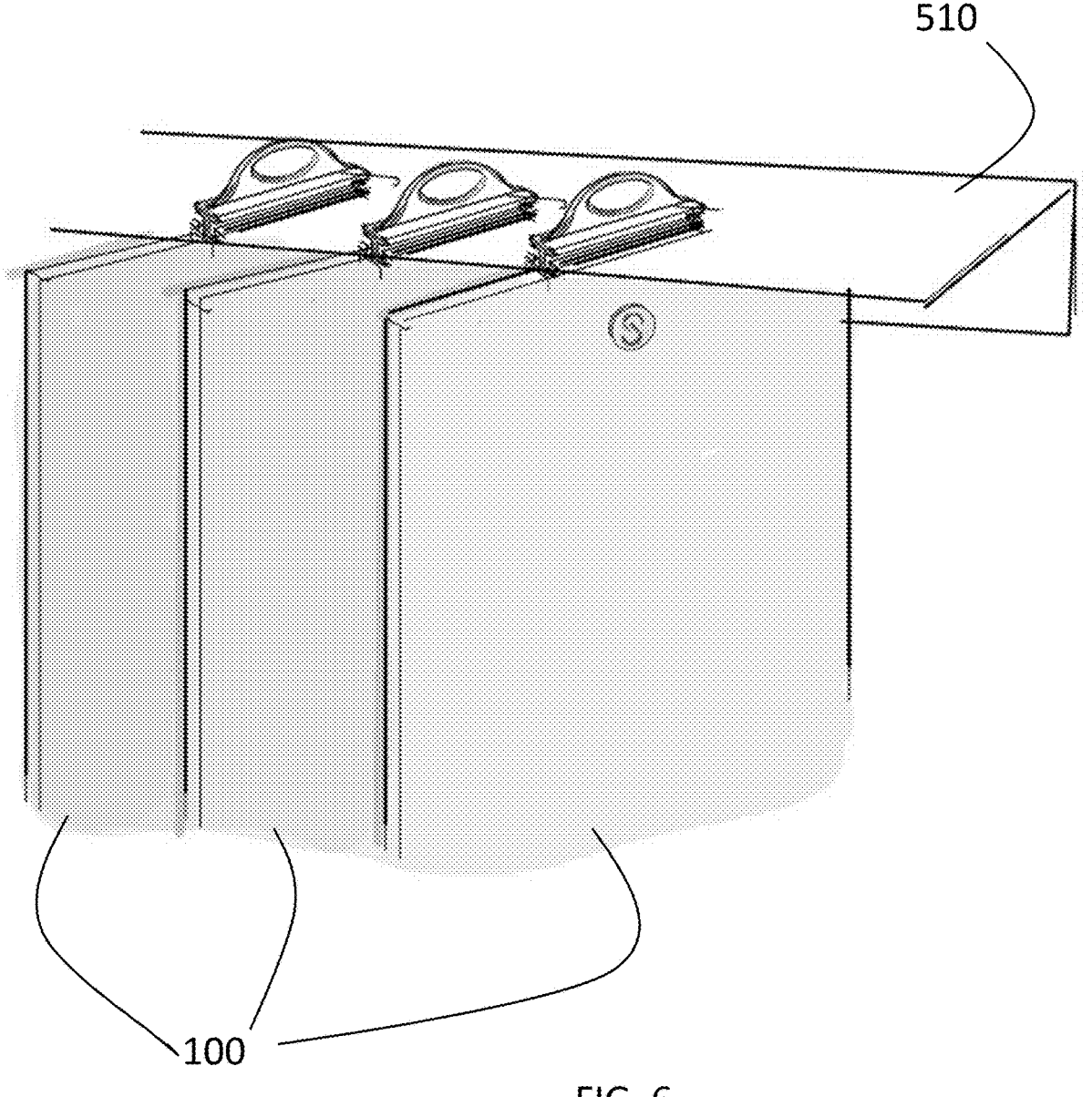
FIG. 6 is a front perspective view of a system for handling and/or displaying a monolithic building material at a point of purchase in accordance with a preferred embodiment of the present invention in which a plurality of monolithic building materials are displayed hanging side-by-side in a rack.
Figure 7A:
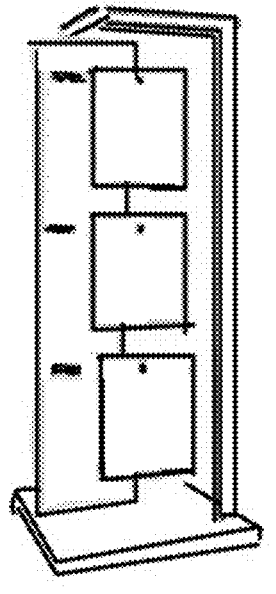
FIGS. 7A-7C illustrate a variety of monolithic building material display arrangements that can be adapted to work with a system for handling and/or displaying a monolithic building material at a point of purchase in accordance with a preferred embodiment of the present invention.
Figure 7B:
Figure 7C:
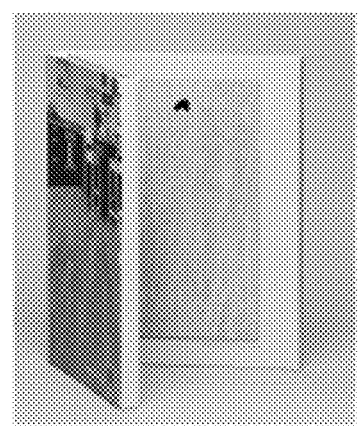
Figure 8A:
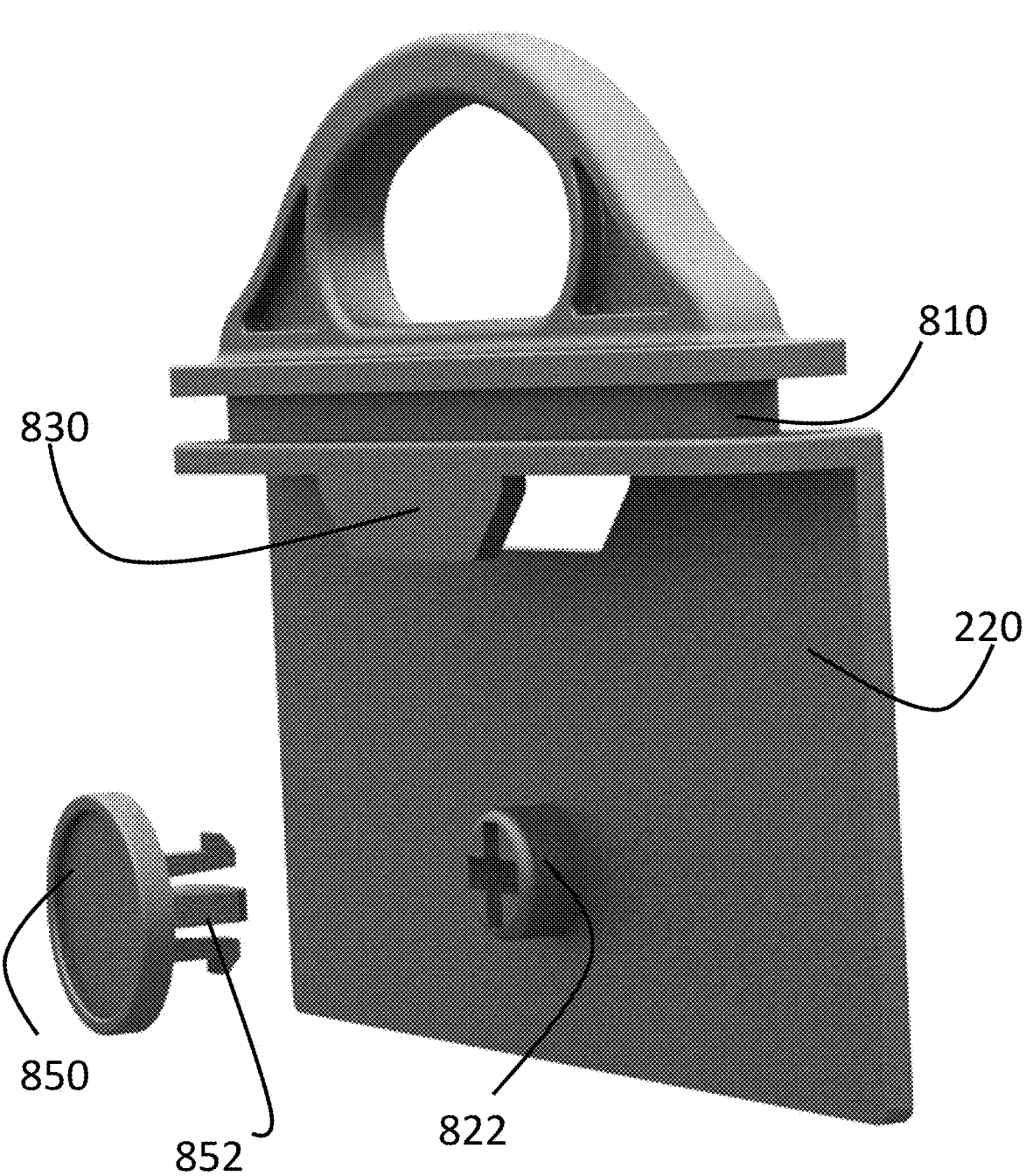
FIG. 8A is a front perspective view of an alternate embodiment of a monolithic building material support according to a second preferred embodiment of the present invention.
Figure 8B:
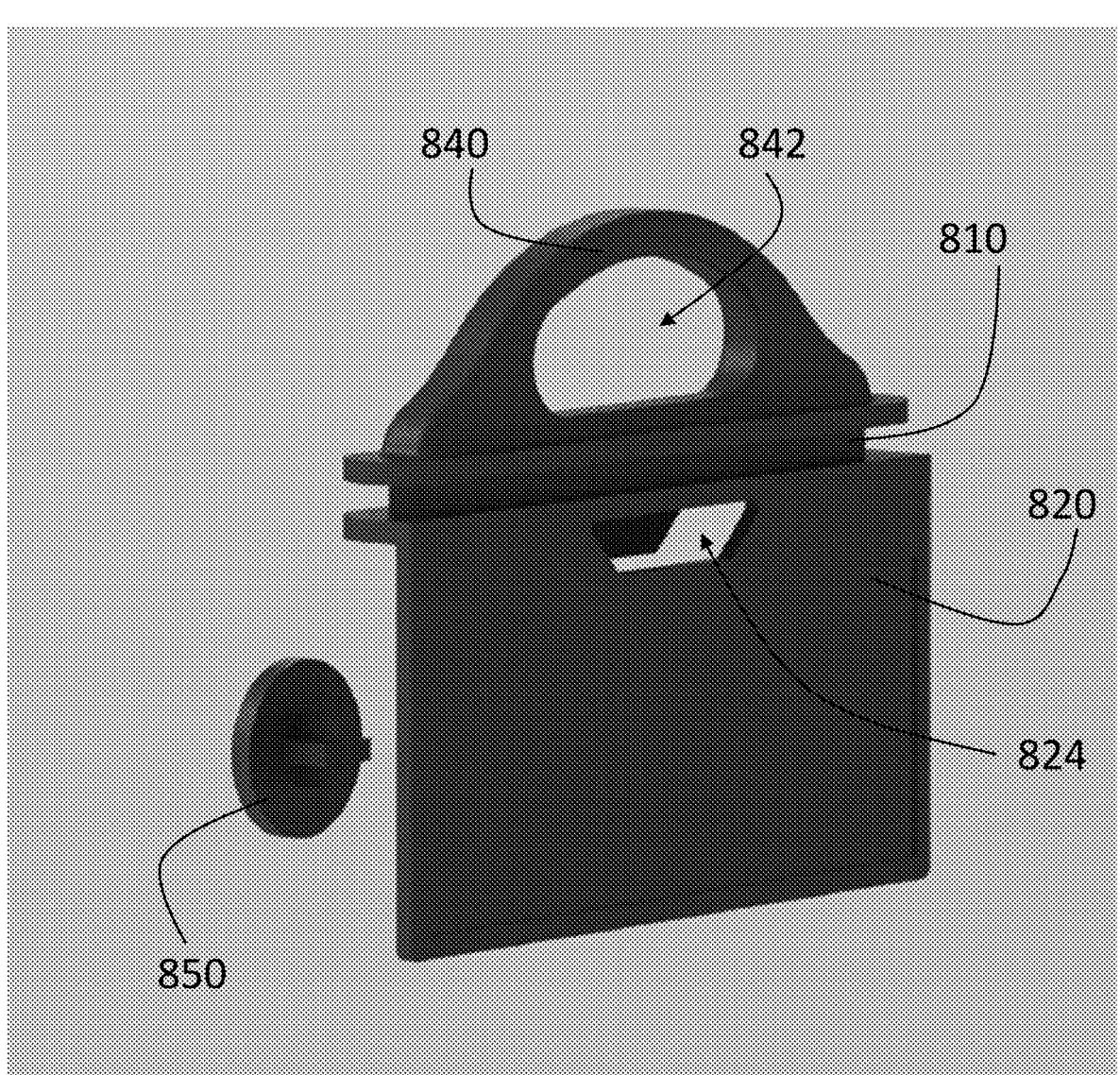
FIG. 8B is a rear perspective view of an alternate embodiment of a monolithic building material support according to the second preferred embodiment of the present invention.
Figure 9A:
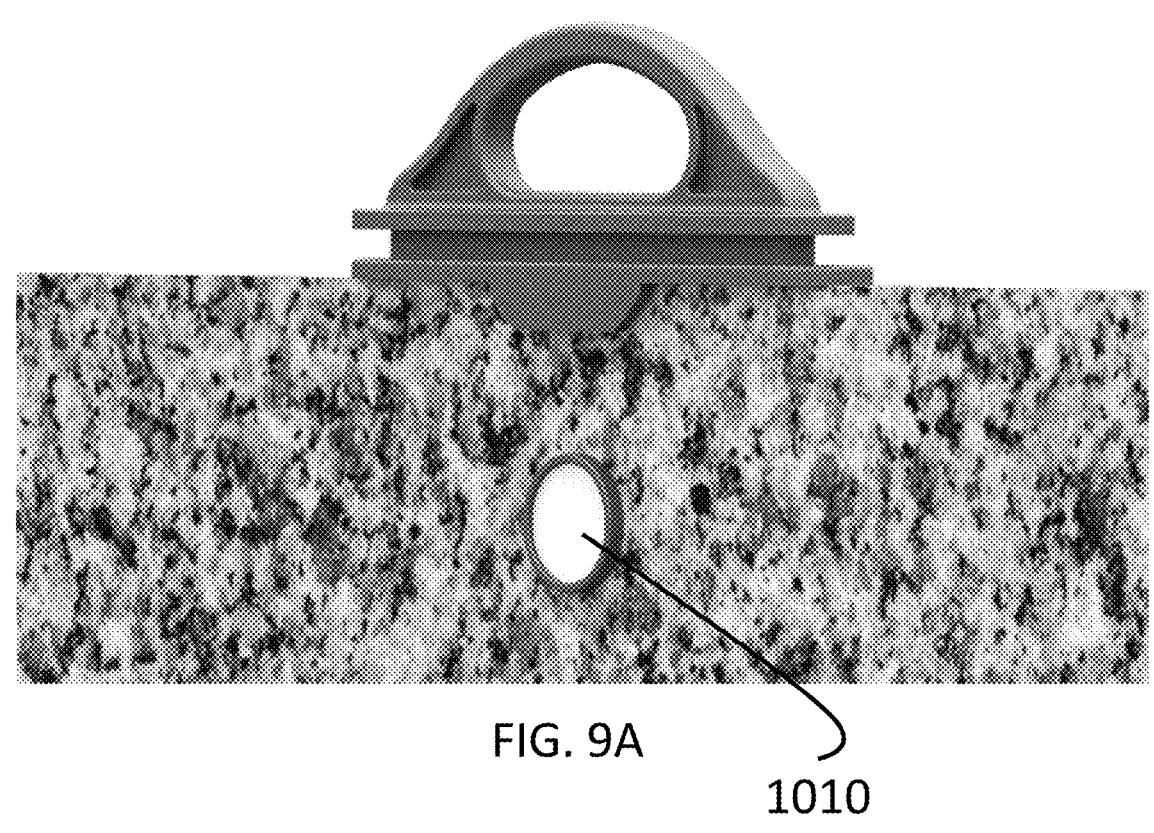
FIG. 9A is a front perspective view of an alternate embodiment of a monolithic building material support system according to the second preferred embodiment of the present invention.
Figure 9B:
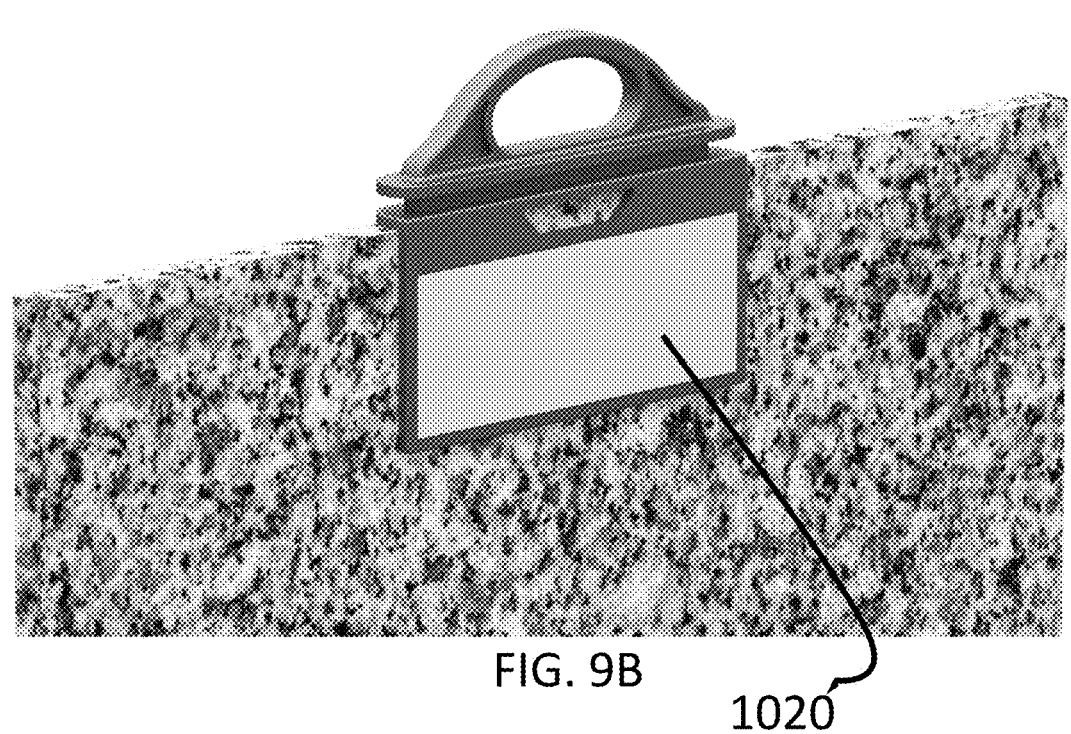
FIG. 9B is a rear perspective view of an alternate embodiment of a monolithic building material support system according to the second preferred embodiment of the present invention.
Figures 10A, 10B:
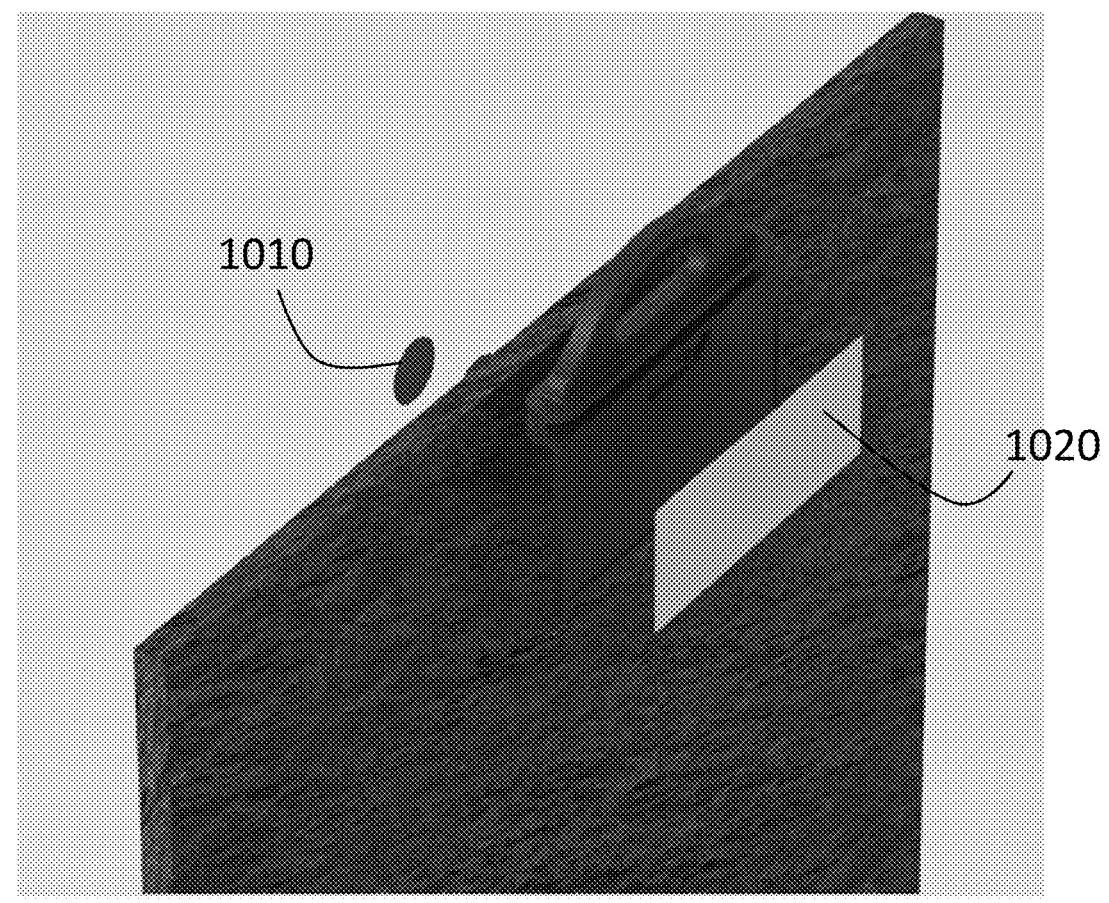
FIGS. 10A and 10B is a rear perspective view of labels being applied to the back of the back support member and the head of a connector in accordance with a preferred embodiment of the present invention.

Still further, as shown in FIGS. 5 and 6 the system (500) may include a structure for displaying a monolithic building material. Such a structure (500) may include a shelf (510) having a plurality of slots (520) for receiving an I-beam structural support member (210). The open end of the slot may be larger than the remainder of the slot in a self-alignment feature. With a system a plurality of monolithic building material supports systems may be held in the shelf 510. Other items such as a feature favorite display (FIG. 7A), a workstation (FIG. 7B) or display folder (FIG. 7C) may be designed to work with the present invention. Further, the present invention may allow for a monolithic building material to be held on a display board without using glue to the hold the monolithic building material in place.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

What is claimed is:

1. A display system comprising:
   a rigid building material having a density great than 1300 kg/m$^3$ and having a hole therein;
   a building material support connected to said rigid building material, said building material support comprising:

a structural member with an I-shaped cross-section and a handle extending from a top side of said structural member;
   a front support member extending from a front side of a bottom of said structural member onto a front face of said rigid building material;
   a back support member extending from a rear side of a bottom of said structural member onto a back face of said rigid building material, said back support member having a hole, said hole in said back support being aligned with said hole in said rigid building material; and
   a connector having a head on a front side of said rigid building material and a pin extending from said head on said front face of said rigid building material, through said hole in said rigid building material and secured in said hole in said back support member, wherein said connector further comprises printed matter on said head of said connector.

2. The display system of claim 1 wherein said printed matter comprises a QR code.

3. The display system of claim 1 wherein said printed matter comprises a label.

4. A display system comprising:
   a rigid building material having a density great than 1300 kg/m$^3$ and having a hole therein;
   a building material support connected to said rigid building material, said building material support comprising:
   a structural member with an I-shaped cross-section and a handle extending from a top side of said structural member;
   a front support member extending from a front side of a bottom of said structural member onto a front face of said rigid building material;
   a back support member extending from a rear side of a bottom of said structural member onto a back face of said rigid building material, said back support having a hole for receiving a pin, said hole in said back support being aligned with said hole in said rigid building material; and
   a connector having a head on a front side of said rigid building material and a pin extending from said head on said front face of said rigid building material, through said hole in said rigid building material and secured in said hole in said back support member.

\* \* \* \* \*